(12) United States Patent
Phillips

(10) Patent No.: US 8,246,501 B2
(45) Date of Patent: Aug. 21, 2012

(54) FOUR-MODE HYBRID POWERTRAIN WITH TWO MOTOR/GENERATORS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 12/725,496

(22) Filed: Mar. 17, 2010

(65) Prior Publication Data

US 2011/0230291 A1    Sep. 22, 2011

(51) Int. Cl.
    *F16H 3/72* (2006.01)
(52) U.S. Cl. .......................................... 475/5
(58) Field of Classification Search ................ 475/5
    See application file for complete search history.

(56) References Cited

U.S. PATENT DOCUMENTS

| | | | |
|---|---|---|---|
| 7,282,004 B2* | 10/2007 | Raghavan et al. | 475/5 |
| 7,699,735 B2* | 4/2010 | Conlon | 475/5 |
| 2006/0276288 A1* | 12/2006 | Iwanaka et al. | 475/5 |
| 2011/0053724 A1* | 3/2011 | Phillips | 475/5 |
| 2011/0086737 A1* | 4/2011 | Phillips | 475/5 |
| 2011/0130234 A1* | 6/2011 | Phillips | 475/5 |

* cited by examiner

*Primary Examiner* — Dirk Wright
(74) *Attorney, Agent, or Firm* — Quinn Law Group, PLLC

(57) ABSTRACT

A hybrid electro-mechanical transmission connectable with multiple power sources includes an output member and a stationary member. The transmission also includes a first planetary gear set having a first, second, and third node, and a compound planetary gear arrangement having a fourth, a fifth, a sixth, a seventh and an eighth node. The power sources include an engine, a first motor/generator and a second motor/generator. The engine and the first motor/generator are each operatively connected to the first planetary gear set. The second motor/generator is operatively connected to each of the first and the second planetary gear sets. The output member is operatively connected to the compound planetary gear set. Thus configured, the transmission provides under-drive, direct-drive, over-drive, and reverse gears for launching and propelling the vehicle.

19 Claims, 3 Drawing Sheets

FOUR-MODE HYBRID POWERTRAIN WITH TWO MOTOR/GENERATORS

TECHNICAL FIELD

The invention relates to a hybrid electro-mechanical powertrain having two motor/generators.

BACKGROUND OF THE INVENTION

To produce a more efficient vehicle, common hybrid vehicle powertrains combine an electric motor and a conventional engine. Torque from the engine and the electric motor is typically channeled to the vehicle's driven wheels via a transmission. Efficiency of a hybrid vehicle powertrain is typically related to the percentage of time and during what type of driving conditions the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle.

A hybrid powertrain utilizing an engine and two electric motors may connect the engine and the electric motors to a transmission such that torque and speed of the engine may be selected independently of vehicle speed and desired acceleration. Such control of the engine is typically achieved by varying individual torque contribution from the two electric motors. Thus, a hybrid powertrain utilizing an engine in combination with two electric motors may provide suitable torque contribution from each of the engine and the two motors and afford improved overall vehicle efficiency.

SUMMARY OF THE INVENTION

A hybrid electro-mechanical transmission connectable with multiple power sources for launching and propelling a vehicle is provided, and includes an output member and a stationary member. The transmission also includes a first planetary gear set having a first, a second, and a third node, and a compound planetary gear set arrangement having a fourth, a fifth, a sixth, a seventh, and an eighth node. The power sources include a first motor/generator, a second motor/generator, and an engine. The engine and the first motor/generator are each operatively connected to the first planetary gear set, the second motor/generator is operatively connected to each of the first and the second planetary gear sets, and the output member is operatively connected to the compound planetary gear set. The transmission thereby provides a total of four gears or modes, including a forward under-drive mode, a forward direct drive mode, a forward over-drive mode, and a reverse mode.

The compound planetary gear arrangement may include a second and a third planetary gear set. In such an arrangement, the first node may be a ring gear member of the first planetary gear set, the second node may be a carrier member of the first planetary gear set, and the third node may be a sun gear member of the first planetary gear set. Additionally, the fourth node may then be a sun gear member of the second planetary gear set, the fifth node may be a ring gear member of the third planetary gear set, the sixth node may be a sun gear member of the third planetary gear set, the seventh node may be a ring gear member of the second planetary gear set. Furthermore, the eight node may then be a carrier member of the second planetary gear set in fixed connection with a carrier member of the third planetary gear set.

The engine may be operatively connected to the first node, the first motor/generator may be operatively connected to the third node, the second motor/generator may be operatively connected to the second and seventh nodes, and the output member may be operatively connected to the fifth node. The transmission may include a first torque-transmitting device, a second torque-transmitting device, a third torque-transmitting device, and a fourth torque-transmitting device. In such a case, the first torque-transmitting device may be engageable to ground the fourth node to the stationary member, the second torque-transmitting device may be engageable to lock any one of the fourth, the fifth, the sixth, the seventh and the eighth node to any other of the fourth, the fifth, the sixth, the seventh and the eighth node. Additionally, the third torque-transmitting device may then be engageable to ground one of the sixth and eighth nodes to the stationary member, and the fourth torque-transmitting device may be engageable to ground the seventh node to the stationary member.

In the above arrangement, engaging the first torque-transmitting device, and disengaging the second, the third and the fourth torque-transmitting devices provides the forward under-drive mode; engaging the second torque-transmitting device, and disengaging the first, the third and the fourth torque-transmitting devices provides the forward direct drive mode; engaging the third torque-transmitting device, and disengaging the first, the second and the fourth torque-transmitting devices provides the forward over-drive mode; and engaging the fourth torque-transmitting device, and disengaging the first, the second and the third torque-transmitting devices provides the reverse mode. Any of the first, second, third and fourth torque-transmitting devices described above may be one of a selectively engageable clutch and a selectively engageable brake capable of transmitting torque in two directions.

The transmission may additionally include a fifth torque-transmitting device, wherein the fifth torque-transmitting device grounds the engine to the stationary member, such that the transmission provides the forward under-drive mode and the reverse under-drive mode via the first and second motor/generators without the aid of the engine. The fifth torque-transmitting device may be a one-way clutch.

In the transmission, the respective operative connections of the engine and of the motor/generators with the first, the second and the third planetary gear sets may facilitate a controlled selection of speeds and torques of the engine and of the motor/generators for launching and propelling the vehicle.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
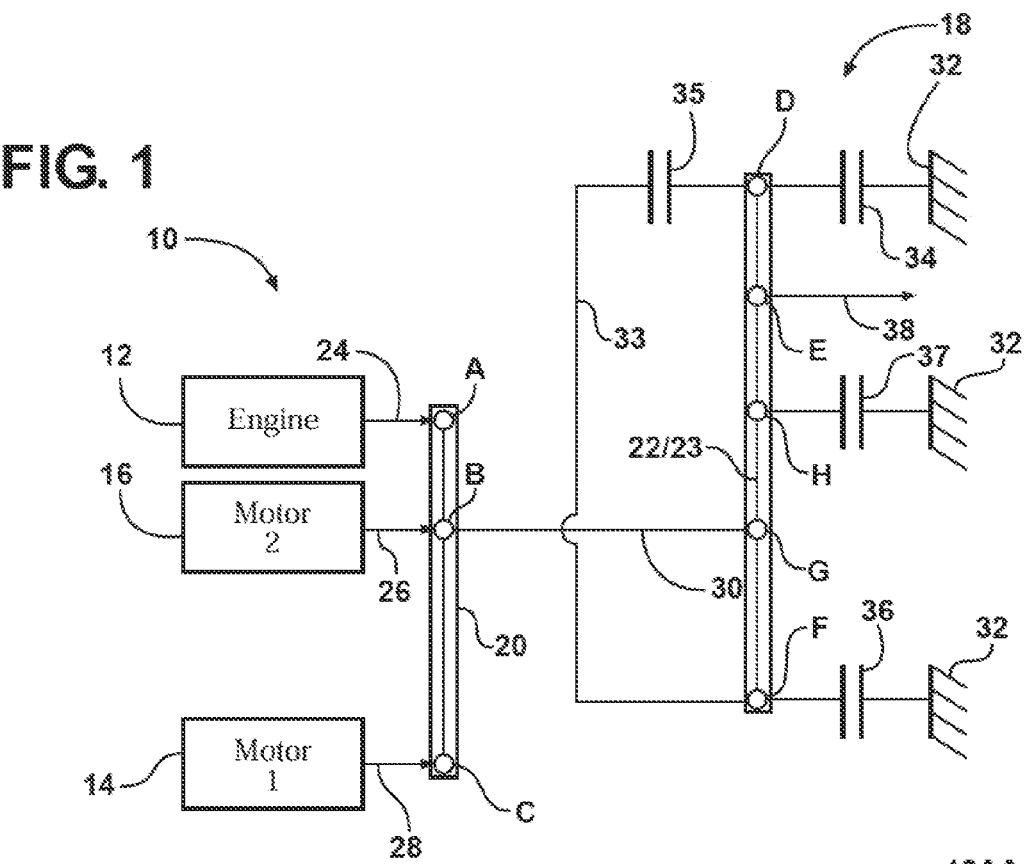
FIG. 1 is a schematic lever diagram illustration of an electrically variable transmission employed in a hybrid powertrain.

Referring to the drawings, wherein like reference numbers refer to like components, FIG. 1 illustrates a hybrid powertrain 10. The hybrid powertrain 10 includes multiple power sources, which include an internal combustion engine 12, a first electric motor/generator 14, and a second electric motor/generator 16, all connected to an "electrically variable transmission" (EVT) designated generally by the numeral 18. As is known by those skilled in the art, an "electrically variable transmission" constitutes a transmission planetary gear train operatively connected with each of the engine 12, the first motor/generator 14 and the second motor/generator 16. Channeling respective torques of the engine and the two motor/generators to different members of the planetary gear train permits one of the power sources to either assist or balance the operation of any of the other two. Thus, the combination of one engine 12 and two motor/generators 14 and 16 operatively connected to the EVT 18 allows speeds and torques of the engine and motor/generators to be controlled and selected independently in order to power a subject vehicle more efficiently. Furthermore, the connections of the hybrid powertrain 10, to be described in greater detail below, may permit an overall decrease in torque requirement from the combination of the first and the second motor/generators while affording acceptable vehicle performance, as compared with other systems.

The EVT 18 includes three planetary gear sets represented in lever diagram form in FIG. 1. A lever diagram is a schematic representation of the components of a mechanical device such as an automatic transmission. Each individual lever represents a planetary gear set or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, authored by Benford, Howard and Leising, Maurice, "The Lever Analogy: A New Tool in Transmission Analysis", 1981, which is hereby fully incorporated by reference.

A lever or first planetary gear set 20 includes a first, second, and third nodes, A, B and C, respectively. The nodes A, B, and C represent a first, second and third members of the first planetary gear set, preferably a ring gear member, a carrier member and a sun gear member, although not necessarily in that order. The EVT 18 also includes a second planetary gear set and a third planetary gear set. The second planetary gear set and the third planetary gear set are connected such that the resultant structure produces a five-node lever, and includes fourth, fifth, sixth, and seventh and eighth nodes D, E, F, G and H, respectively. Each of the second and third gear sets have a first, a second and a third member, preferably a ring gear member, a carrier member and a sun gear member, although not necessarily in that order.

In general, as known by those skilled in the art, two planetary gear sets may be connected to establish a five-node lever. In such a case, a five-node lever is established by providing a first fixed connection, i.e. pairing, between the respective planet carriers of the two gear sets; and a second pairing via pinion-to-pinion, or "long-pinion" connections. Overall, these connections reduce the maximum number of separately rotating inertias (about a common central axis) from six to five, and the total degrees of freedom from four to two. Thus constrained, the compound planetary gear arrangement provides, in order of rotational speed, first, second, third, fourth and fifth nodes. A five-node lever may thus be constructed by creating a compound set from two planetary gear sets bridged or connected by long-pinions. Such long-pinions may either be "straight", i.e., having two opposing ends with a common diameter, thus necessitating at least one additional set of pinions to establish a separate node, or "stepped", i.e., having opposing ends with dissimilar diameters. Additionally, a five-node lever may be established by interconnecting three planetary gear sets. A compound gear set established by variations of any of the schemes outlined above provides, at a minimum, in order of rotational speed, first, second, third, fourth, and fifth nodes.

A typical compound planetary gear arrangement capable of providing a five-node lever is a double-pinion integrated structure gear set. Such a double-pinion integrated structure gear set generally includes a common carrier member, a sun gear member, and two sets of intermeshing pinion gears, where a first set of pinion gears intermeshes with the sun gear member. The first set of pinion gears also intermeshes and co-rotates with a second set of pinion gears. Because the two sets of pinion gears intermesh, the second pinion gear set reverses the direction of rotation of the first pinion gear set. The gears of the first set of pinion gears may have a different individual diameter than the pinion gears of the second set, thereby creating a fixed ratio between the gears of the first and of the second pinion gear sets. Employing such a compound integrated structure gear set from two planetary gear sets connected by long-pinions in place of three conventional gear sets permits a more compact gear train arrangement that is capable of providing an additional transmission gear ratio, and an output rotation whose direction is the reverse of its input. However, as understood by those skilled in the art, various compound planetary gear arrangements may be constructed to provide a five-node lever that will accomplish such a result, and place them within the scope of the lever diagram of FIG. 1.

As shown in FIG. 1, planetary gear sets 22 and 23 are connected continuously at node H, which preferably represents the carrier member of gear set 22 connected to the carrier member of gear set 23. The nodes E and G, preferably representing the ring gear of gear set 22 and the ring gear of gear set 23, although not necessarily in that order, are not connected. The nodes D and F, preferably representing the sun gear of gear set 22 and the sun gear of gear set 23, although not necessarily in that order, are similarly not connected. A "long-pinion" connection, as described above, is also provided, such that the planetary gear set 22 and the planetary gear set 23 form a compound double-pinion integrated structure gear set 22/23.

Engine 12, first electric motor/generator 14, and second electric motor/generator 16 are operatively connected to the EVT 18 via an input member arrangement. The input member arrangement from the power sources provides torque to the EVT 18. The input member arrangement includes an output shaft of the engine 12 which serves as an input member 24, a rotor of the second motor/generator 16 that serves as an input member 26, and a rotor of the first motor/generator 14 that serves as an input member 28. The input member 24 is configured to provide engine torque to the EVT 18. The input member 26 and input member 28 are each configured to provide torque from the second motor/generator and from the first motor/generator, respectively, to the EVT 18.

As shown, the first node A is continuously connected to the input member 24, the second node B is continuously connected to the input member 26, and the third node C is continuously connected to the input member 28. Although engine 12, second electric motor/generator 16, and first electric motor/generator 14, as shown, are connected to nodes A, B, and C, respectively, the connections to nodes A, B, and C do not necessarily have to be in order of rotational speed. The connection of engine 12 at the first planetary gear set, however, may only be at a node that is not continuously connected to the compound planetary gear set.

A first interconnecting member 30 continuously interconnects the second node B with the seventh node G. The fourth node D is selectively connectable with a stationary member or housing 32 of the EVT 18 via a first torque-transmitting device 34, to thereby ground the fourth node. The fourth node D is also selectively connectable with the sixth node F by way of a second interconnecting member 33 via a second torque-transmitting device 35. The sixth node F is selectively connectable with a stationary member or housing 32 of the EVT 18 via a third torque-transmitting device 36, to thereby ground the sixth node. The eighth node H is selectively connectable with a stationary member or housing 32 of the EVT 18 via a fourth torque-transmitting device 37, to thereby ground the eighth node. The first, second, third and fourth torque-transmitting devices 34, 35, 36 and 37 may be configured as selectively or automatically engageable, and be capable of transmitting torque in two directions, as understood by those skilled in the art. Well known examples of torque-transmitting devices capable of transmitting torque in two directions are friction plate-type clutches, brakes, and dog clutches. The fifth node E is continuously connected with the output member 38, which provides output torque for launching and propelling the vehicle.

As understood by those skilled in the art, powertrain 10 additionally has an electric power source (not shown), such as one or more batteries. The electric power source is operatively connected to the motor/generators 14 and 16 such that the motor/generators may transfer power to or receive power from the engine 12. The powertrain 10 also includes a controller or ECU (not shown). The controller is operatively connected to the electric power source to control the distribution of power from or to the power source.

Figure 2:
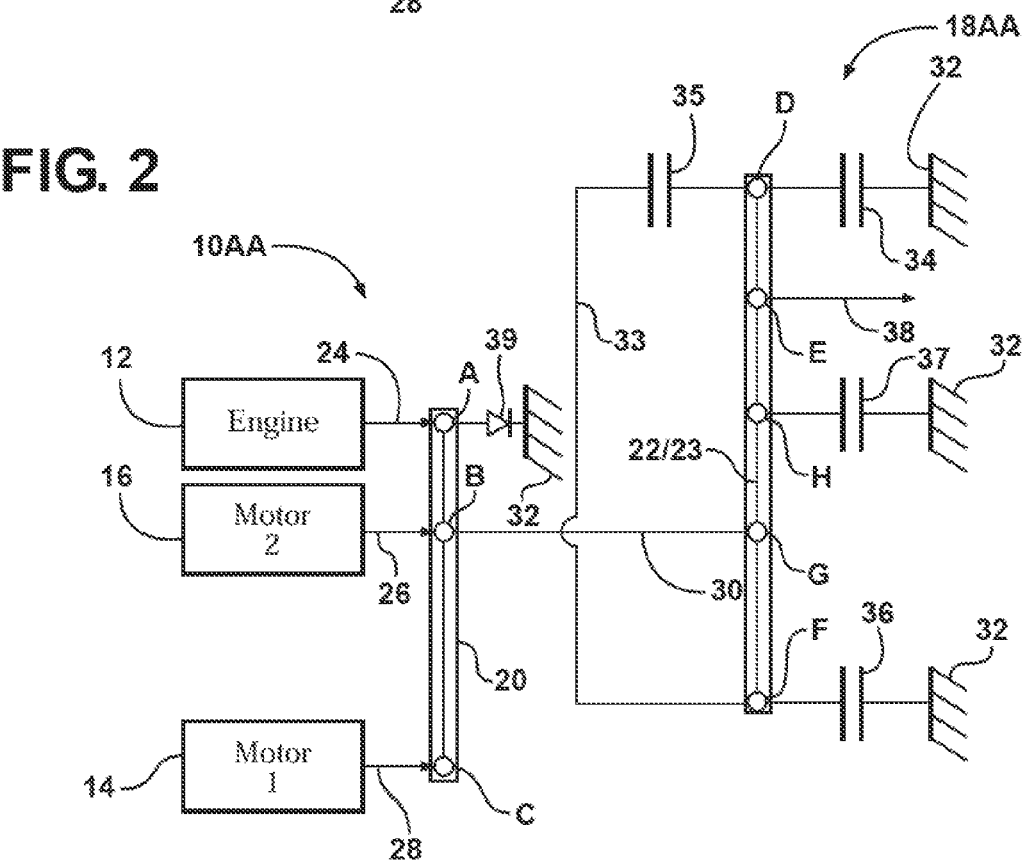
FIG. 2 is a schematic lever diagram illustration of an electrically variable transmission having an optional engine grounding torque-transmitting device.

FIG. 2 depicts a powertrain 10AA which includes an EVT 18AA. Powertrain 10AA is identical to powertrain 10 shown in FIG. 1 in all respects other than having a fifth torque-transmitting device 39, with all identical elements numbered correspondingly. The fifth torque-transmitting device 39 is preferably a one-way clutch, which passively grounds node A. Functionally, the fifth torque-transmitting device 39 serves as a brake to lock the first node A by grounding engine 12 to stationary member 32 and facilitate an electric-only vehicle propulsion in forward or in reverse.

Because EVT 18AA has an explicit reverse gear, the fifth torque-transmitting device 39 may be a passive one-way clutch to effectively and reliably ground the engine 12, and prevent it from rotating backward. In turn, such ability to ground the engine permits a "strong" electric-only launch of the vehicle, i.e., employing both motor/generators 14 and 16, either forward or in reverse, with the capability to transmit torque that is roughly equivalent to a full-throttle engine launch. By contrast, without the benefit of an explicit reverse gear, the strongest possible electric-only reverse launch, i.e., using both motor/generators 14 and 16, typically requires engine 12 to resist being rotated forward, while the forward launch requires the engine to resist being rotated backward. Hence, without a dedicated reverse gear, as employed herein, an actively controlled, two-way clutch is commonly required for "strong" electric-only launch torque capability.

Figure 3:
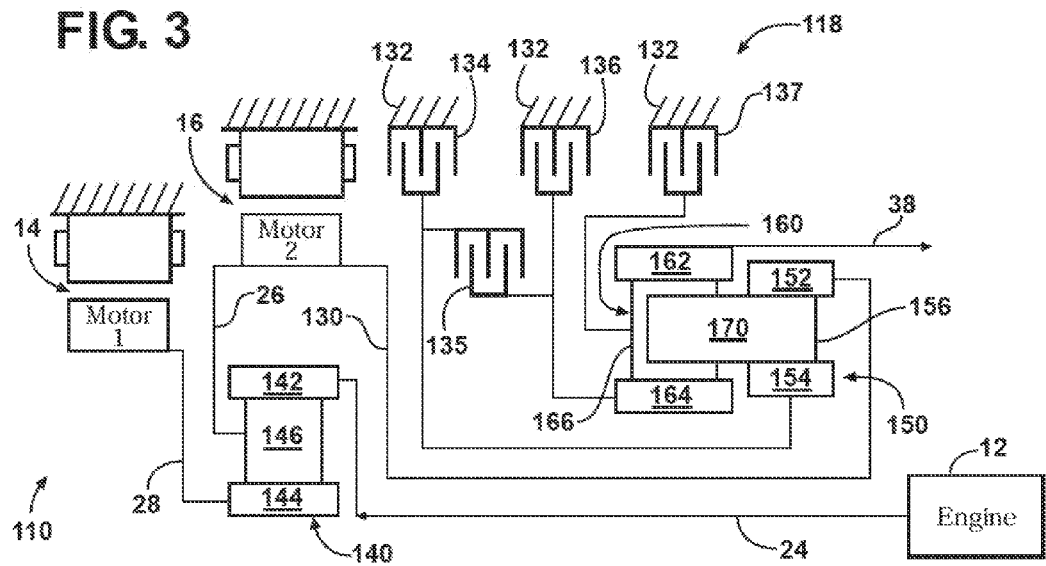
FIG. 3 is a schematic stick diagram illustration of the powertrain employing three planetary gear sets corresponding with the lever diagram of FIG. 1 according to one embodiment.

FIG. 3 depicts a powertrain 110 having an EVT 118. The powertrain 110 is a first specific embodiment of powertrain 10 shown in FIG. 1. The EVT 118 is represented by a schematic stick diagram that depicts specific planetary gear set connections corresponding to, and reflected by the lever diagram of FIG. 1. Although a specific powertrain 110 is represented, it will be understood that the particular embodiment is simply exemplary in nature, and other powertrain arrangements within the scope of the lever diagram of FIG. 1 are also contemplated.

The EVT 118 utilizes three differential gear sets, preferably a first planetary gear set 140, a second planetary gear set 150 and a third planetary gear set 160. First planetary gear set 140 employs a ring gear member 142, which circumscribes a sun gear member 144. A carrier member 146 rotatably supports a plurality of pinion gears that meshingly engage both the ring gear member 142 and the sun gear member 144. The second planetary gear set 150 employs a ring gear member 152, which circumscribes a sun gear member 154. The second planetary gear set 150 additionally includes a carrier member 156. The third planetary gear set 160 employs a ring gear member 162 which circumscribes a sun gear member 164, and a carrier member 166 which rotatably supports a plurality of pinion gears that meshingly engage both the ring gear member 162 and the sun gear member 164. The carrier member 156 and the carrier member 166 are continuously connected to one another, thereby providing a unitary carrier structure. A set of long-pinion gears 170 is rotatably supported by the unitary structure of carrier member 156 and carrier member 166. The set of long-pinion gears 170 meshingly engages both the ring gear member 152 and the sun gear member 154, and additionally meshingly engages pinion gears of planetary gear set 160. The output member 38 is continuously connected with the ring gear member 162.

The engine 12 is continuously connected to the ring gear member 142 via the input member 24. The first motor/generator 14 is continuously connected to the sun gear member 144 via the input member 28. The second motor/generator 16 is continuously connected to the carrier member 146 via the input member 26 and to the ring gear member 152 via an interconnecting member 130. As a result, the carrier member 146 is continuously connected to the ring gear member 152. Accordingly, the connections and interactions between planetary gear sets 140, 150 and 160 are reflected by the lever diagram depicted in FIG. 1. Ring gear member 142, carrier member 146, and sun gear member 144 correspond to nodes A, B, and C of FIG. 1, respectively. Sun gear member 154, ring gear member 162, sun gear member 164, and ring gear member 152 correspond with nodes D, E, F, and G, and the connected carrier members 156 and 166 correspond with node H of FIG. 1, respectively.

The first torque-transmitting device 134 is selectively engageable to ground the sun gear member 154 with a stationary member 132, e.g., the transmission housing. The second torque-transmitting device 135 is selectively engageable to connect the sun gear member 154 with the sun gear member 164. The third torque-transmitting device 136 is selectively engageable to ground the sun gear member 164 with the stationary member 132. The fourth torque-transmitting device 137 is selectively engageable to ground the connected carrier members 156 and 166 with the stationary member 132. The torque-transmitting devices 134, 135, 136 and 137 are engageable in like manner as corresponding torque-transmitting devices 34, 35, 36 and 37, of FIG. 1, to establish first, second, third and fourth electrically variable forward modes.

Figure 4:
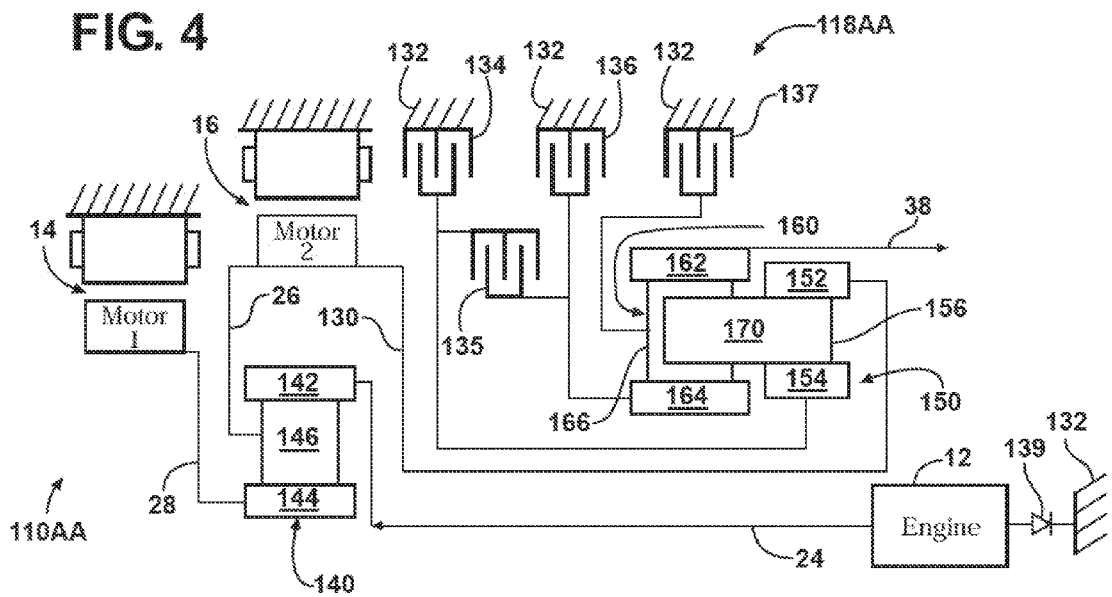
FIG. 4 is a schematic stick diagram illustration of a powertrain employing three planetary gear sets corresponding with the lever diagram of FIG. 1 according to a second embodiment.

FIG. 4 depicts a powertrain 110AA having an EVT 118AA. The powertrain 110AA is a specific embodiment of powertrain 10AA shown in FIG. 2. The EVT 118 is represented by a schematic stick diagram that depicts specific planetary gear set connections corresponding to, and reflected by the lever diagram of FIG. 2. Additionally, powertrain 110AA is identical to powertrain 110 shown in FIG. 3 in all respects other than having a fifth torque-transmitting device 139, with all identical elements numbered correspondingly. As described with respect to FIG. 2, fifth torque-transmitting device 139 is preferably a one way clutch. The fifth torque-transmitting device 139 is selectively engageable to ground engine 12 to stationary member 32 and facilitate an electric-only vehicle propulsion in forward or in reverse. Although a specific powertrain 110AA is represented, it will be understood that the particular embodiment is simply exemplary in nature, and other powertrain arrangements within the scope of the lever diagram of FIG. 2 are also contemplated.

Figure 5:
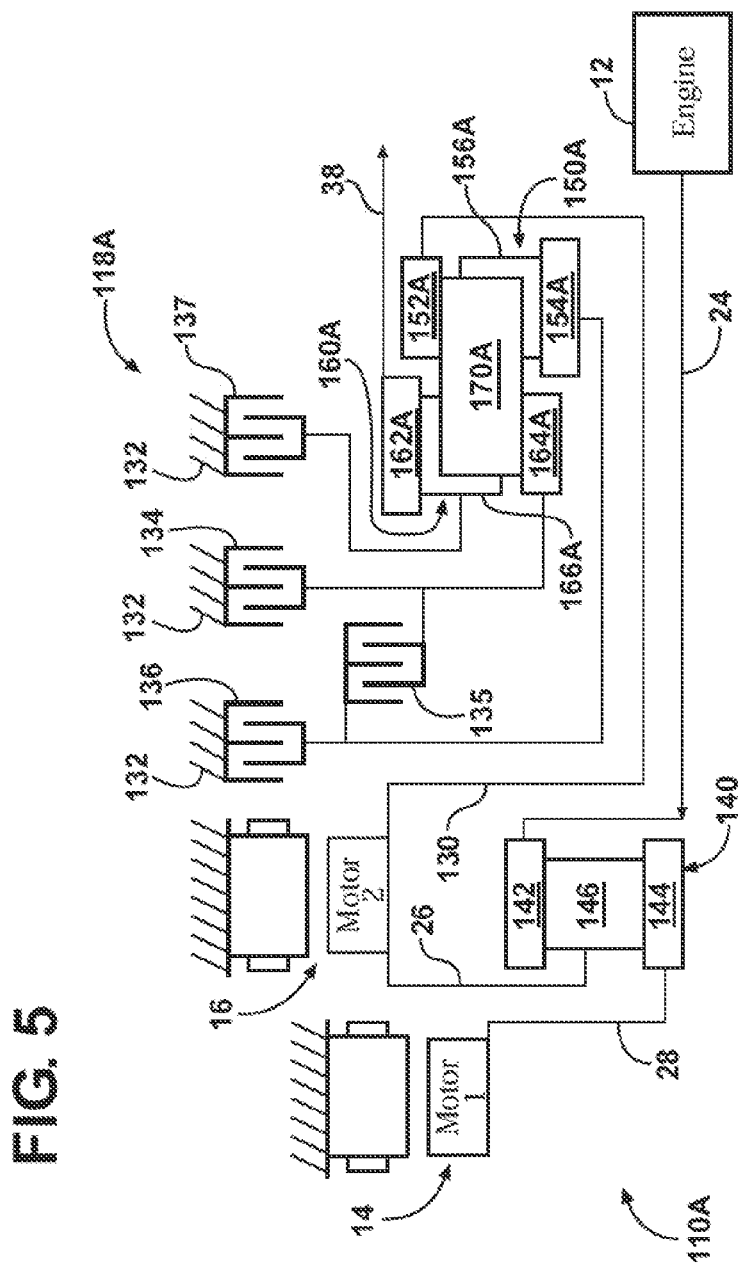
FIG. 5 is a schematic stick diagram illustration of a powertrain employing three planetary gear sets corresponding with the lever diagram of FIG. 1 according to a third embodiment.

FIG. 5 depicts a powertrain 110A having an EVT 118A. The powertrain 110A is a second specific embodiment of the powertrain 10 shown in FIG. 1. The EVT 118A is represented by a schematic stick diagram that depicts specific planetary gear set connections corresponding to, and reflected by the lever diagram of FIG. 1. Although a specific powertrain 110A is represented, it will be understood that the particular embodiment is simply exemplary in nature, and other powertrain arrangements within the scope of the lever diagram of FIG. 1 are also contemplated.

The EVT 118A utilizes three differential gear sets, preferably a first planetary gear set 140, a second planetary gear set 150A and a third planetary gear set 160A. EVT 118A includes the first planetary gear set 140, same as described above with respect to EVT 118 of FIG. 3. The second planetary gear set 150A employs a ring gear member 152A, which circumscribes a sun gear member 154A. A carrier member 156A rotatably supports a plurality of pinion gears that meshingly engage the sun gear member 154A. The third planetary gear set 160A employs a ring gear member 162A which circumscribes a sun gear member 164A, and a carrier member 166A which rotatably supports a plurality of pinion gears that meshingly engage the ring gear member 162A. The carrier member 156A and the carrier member 166A are continuously connected to one another, thereby providing a unitary carrier structure. A set of long-pinion gears 170A is rotatably supported by the unitary structure of carrier member 156A and carrier member 166A. The set of long-pinion gears 170A meshingly engages both the ring gear member 152A and the sun gear member 164A, and additionally meshingly engages pinion gears of planetary gear set 150A and pinion gears of planetary gear set 160A. The output member 38 is continuously connected with the ring gear member 162A.

Identically to powertrain 110 of FIG. 1, engine 12 of powertrain 110A is continuously connected to ring gear member 142 via the input member 24. Similarly, first motor/generator 14 is continuously connected to sun gear member 144 via the input member 28, and second motor/generator 16 is continuously connected to carrier member 146 via input member 26 and to the ring gear member 152 via an interconnecting member 130. Hence, the carrier member 146 is continuously connected to the ring gear member 152. Accordingly, the connections and interactions between planetary gear sets 140, 150A and 160A are reflected by the lever diagram depicted in FIG. 1. Ring gear member 142, carrier member 146, and sun gear member 144 correspond to nodes A, B, and C of FIG. 1, respectively. Sun gear member 164A, ring gear member 162A, sun gear member 154A, and ring gear member 152A correspond with nodes D, E, F, and G, and the connected carrier members 156A and 166A correspond with node H of FIG. 1, respectively.

The first torque-transmitting device 134 is selectively engageable to ground the sun gear member 164A with the stationary member 132. The second torque-transmitting device 135 is selectively engageable to connect the sun gear member 154A with the sun gear member 164A. The third torque-transmitting device 136 is selectively engageable to ground the sun gear member 154A with the stationary member 132. The fourth torque-transmitting device 137 is selectively engageable to ground the connected carrier members 156A and 166A with the stationary member 132. The torque-transmitting devices 134, 135, 136 and 137 are engageable in like manner as corresponding torque-transmitting devices 34, 35, 36 and 37, of FIG. 1, to establish first, second, third and fourth electrically variable forward modes.

Although not specifically shown, powertrain 110A may also be configured to have a fifth torque-transmitting device 139, similar to the arrangement shown in FIG. 4. As described with respect to FIG. 4, fifth torque-transmitting device 139 would then be selectively engageable to ground engine 12 to stationary member 132, and facilitate an electric-only vehicle propulsion in forward or in reverse.

The first electrically variable forward mode of powertrain 10 shown in FIG. 1 is an under-drive connection between the second motor/generator 16 and the output member 38, established by engaging the first torque-transmitting device 34, and disengaging the second, the third and the fourth torque-transmitting devices 35, 36 and 37. The under-drive forward mode provides an advantageous low gear ratio, i.e., greater than 1:1, between the input member 26 and the output member 38, thereby multiplying torque developed by the motor/generators 14 and 16 to permit the two motor/generators, even without the aid of the engine 12, to adequately launch the vehicle.

The second electrically variable forward mode of powertrain 10 is a direct drive connection between the second motor/generator 16 and the output member 38, established by engaging the second torque-transmitting device 35, and disengaging the first, the third and the fourth torque-transmitting devices 34, 36 and 37. The direct drive forward mode provides a 1:1 gear ratio between the input member 26 and the output member 38, thereby permitting the torque developed by the motor/generators 14 and 16, and/or the engine 12 to sustain higher vehicle speeds.

The third electrically variable forward mode of powertrain 10 is an over-drive connection between the second motor/generator 16 and the output member 38, established by engaging the third torque-transmitting device 36, and disengaging the first, the second and the fourth torque-transmitting devices 35, 36 and 37. The over-drive forward mode provides a less than 1:1 gear ratio between the input member 26 and the output member 38, thereby permitting the motor/generators 14 and 16 and/or the engine 12 to operate at lower rotational speeds while sustaining higher vehicle speeds.

The fourth mode of powertrain 10 is an electrically variable reverse connection between the second motor/generator 16 and the output member 38, established by engaging the fourth torque-transmitting device 37, and disengaging the first, the second and the third torque-transmitting devices 34, 35 and 36. A reverse mode provided herein may be an under-drive, a direct drive, or an over-drive connection between the input member 26 and the output member 38. Such an electrically variable reverse connection may adequately motivate the vehicle in reverse via the engine 12, whether in combination with the motor/generators 14 and 16 or without, and also permits an electric-only reverse solely via the two motor/generators.

Although not specifically shown with respect to powertrain 110A, it will be understood by those skilled in the art that, similar to powertrains 110 (as described with respect to powertrain 110AA of FIG. 4), powertrain 110A may be configured to include a selectively engageable fifth torque-transmitting device 139. As described with respect to powertrain 110AA, fifth torque-transmitting device 139 is analogous to the fifth torque-transmitting device 39 described above with respect to EVT 18AA shown in FIG. 2. In such a case, the EVT 118 or 118A will be provided with the capability to ground engine 12 to stationary member 132 in order to facilitate an electric-only vehicle propulsion either forward or in reverse. As described above with respect to EVT 18AA, the fifth torque-transmitting device 39 is preferably a one-way clutch that may serve as a brake to prevent backward rotation of engine 12. As will be readily understood by those skilled in the art, in general, both EVT 118 and 118A are appropriate for a front-wheel-drive vehicle architecture, as the output member 38 is in a location well suited for a transverse arrangement common to front-wheel-drive vehicle applications.

A vehicle employing either powertrain 10 or 10AA, of FIGS. 1 and 2, respectively, may be launched from rest in the forward under-drive mode, then switched to being propelled in the forward direct drive mode, and then further switched to being propelled in the more efficient forward over-drive mode to sustain higher vehicle speeds. Such a vehicle may additionally be motivated in the reverse mode. The combination of the first motor/generator 14 and second motor/generator 16 is sized sufficiently to provide ample input torque to launch and propel the vehicle in forward or reverse modes of the EVT 18 or EVT18AA over a wide range of speeds without assist from the engine 12.

While the best modes for carrying out the invention have been described in detail, those familiar with the art to which this invention relates will recognize various alternative designs and embodiments for practicing the invention within the scope of the appended claims.

The invention claimed is:

1. A hybrid electro-mechanical transmission connectable with multiple power sources, comprising:
    an output member;
    a stationary member;
    a first planetary gear set having a first, second, and third node, and
    a compound planetary gear arrangement having a fourth, a fifth, a sixth, a seventh and an eighth node;
    the power sources including:
    a first motor/generator;
    a second motor/generator, and
    an engine;
wherein:
    the engine and the first motor/generator are each operatively connected to the first planetary gear set, the second motor/generator is operatively connected to each of the first gear set and the compound planetary gear arrangement, and the output member is operatively connected to the compound planetary gear arrangement, such that the transmission provides a forward under-drive mode, a forward direct drive mode, a forward over-drive mode, and a reverse mode with respect to at least one of the engine, the first motor/generator, and the second motor/generator.

2. The transmission of claim 1, wherein:
    the compound planetary gear arrangement includes a second and a third planetary gear set;
    the first node is a ring gear member of the first planetary gear set, the second node is a carrier member of the first planetary gear set, and the third node is a sun gear member of the first planetary gear set;
    the fourth node is a sun gear member of the second planetary gear set;
    the fifth node is a ring gear member of the third planetary gear set;
    the sixth node is a sun gear member of the third planetary gear set;
    the seventh node is a ring gear member of the second planetary gear set; and
    the eight node is a carrier member of the second planetary gear set in fixed connection with a carrier member of the third planetary gear set.

3. The transmission of claim 1, wherein:
    the engine is operatively connected to the first node;
    the first motor/generator is operatively connected to the third node;
    the second motor/generator is operatively connected to the second node and to the seventh node; and
    the output member is operatively connected to the fifth node.

4. The transmission of claim 2, further comprising:
    a first torque-transmitting device, a second torque-transmitting device, a third torque-transmitting device, and a fourth torque-transmitting device;
wherein:
    the first torque-transmitting device is engageable to ground the fourth node to the stationary member;
    the second torque-transmitting device is engageable to lock any one of the fourth, the fifth, the sixth, the seventh and the eighth node to any other of the fourth, the fifth, the sixth, the seventh and the eighth node;
    the third torque-transmitting device is engageable to ground one of the sixth and the eighth nodes to the stationary member; and
    the fourth torque-transmitting device is engageable to ground seventh node to the stationary member.

5. The transmission of claim 4, wherein engaging the first torque-transmitting device, and disengaging the second, the third and the fourth torque-transmitting devices provides the forward under-drive mode.

6. The transmission of claim 4, wherein engaging the second torque-transmitting device, and disengaging the first, the third and the fourth torque-transmitting devices provides the forward direct drive mode.

7. The transmission of claim 4, wherein engaging the third torque-transmitting device, and disengaging the first, the second and the fourth torque-transmitting devices provides the forward over-drive mode.

8. The transmission of claim 4, wherein engaging the fourth torque-transmitting device, and disengaging the first, the second and the third torque-transmitting devices provides the reverse mode.

9. The transmission of claim 4, wherein any of the first, second, third and fourth torque-transmitting devices is one of a selectively engageable clutch and a selectively engageable brake capable of transmitting torque in two directions.

10. The transmission of claim 9, further comprising a fifth torque-transmitting device, wherein the fifth torque-transmitting device grounds the engine to the stationary member, such that the transmission provides the forward under-drive mode and the reverse under-drive mode via the first and second motor/generators without the aid of the engine.

11. The transmission of claim 10, wherein the fifth torque-transmitting device is a one-way clutch.

12. The transmission of claim 1, wherein the respective operative connections of the engine and of the motor/generators with the first, the second and the third planetary gear sets facilitate a controlled selection of speeds and torques of the engine and of the motor/generators.

13. A hybrid powertrain, comprising:
an engine;
a first motor/generator;
a second motor/generator;
an electrically-variable transmission having:
an output member;
a stationary member;
a first planetary gear set having a first, second, and third node, and a compound planetary gear arrangement having a fourth, a fifth, a sixth, a seventh and an eighth node; and
a first torque-transmitting device, a second torque transmitting device, a third torque transmitting device, and a fourth torque transmitting device, wherein the first torque-transmitting device is engageable to ground the fourth node to the stationary member, the second torque-transmitting device is engageable to lock any one of the fourth, the fifth, the sixth, the seventh and the eighth node to any other of the fourth, the fifth, the sixth, the seventh and the eighth node, the third torque-transmitting device is engageable to ground one of the sixth and the eighth nodes to the stationary member, and the fourth torque-transmitting device is engageable to ground seventh node to the stationary member;
wherein:
the engine and the first motor/generator are each operatively connected to the first planetary gear set, the second motor/generator is operatively connected to each of the first and the compound planetary gear sets, the output member is operatively connected to the compound planetary gear set, such that the transmission provides a forward under-drive mode, a forward direct drive mode, a forward over-drive mode, and a reverse mode with respect to at least one of the engine, the first motor/generator, and the second motor/generator.

14. The hybrid powertrain of claim 13, wherein:
the compound planetary gear arrangement includes a second and a third planetary gear set;
the first node is a ring gear member of the first planetary gear set, the second node is a carrier member of the first planetary gear set, and the third node is a sun gear member of the first planetary gear set; and
the fourth node is a sun gear member of the second planetary gear set;
the fifth node is a ring gear member of the third planetary gear set;
the sixth node is a sun gear member of the third planetary gear set;
the seventh node is a ring gear member of the second planetary gear set; and
the eight node is a carrier member of the second planetary gear set in fixed connection with a carrier member of the third planetary gear set.

15. The hybrid powertrain of claim 13, wherein:
engaging the first torque-transmitting device, and disengaging the second, the third and the fourth torque-transmitting devices provides the forward under-drive mode;
engaging the second torque-transmitting device, and disengaging the first, the third and the fourth torque-transmitting devices provides the forward direct drive mode;
engaging the third torque-transmitting device, and disengaging the first, the second and the fourth torque-transmitting devices provides the forward over-drive mode; and
engaging the fourth torque-transmitting device, and disengaging the first, the second and the third torque-transmitting devices provides the reverse mode.

16. The hybrid powertrain of claim 13, wherein any of the first, second, third and fourth torque-transmitting devices is one of a selectively engageable clutch and a selectively engageable brake capable of transmitting torque in two directions.

17. The hybrid powertrain of claim 13, further comprising a fifth torque-transmitting device, wherein the fifth torque-transmitting device grounds the engine to the stationary member, such that the transmission provides the forward under-drive mode and the reverse under-drive mode via the first and second motor/generators without the aid of the engine.

18. The hybrid powertrain of claim 17, wherein the fifth torque-transmitting device is a one way clutch.

19. The hybrid powertrain of claim 13, wherein the respective operative connections of the engine and of the motor/generators with the first, the second and the third planetary gear sets facilitate a controlled selection of speeds and torques of the engine and of the motor/generators.

\* \* \* \* \*